United States Patent

Hirano (10) Patent No.: US 9,432,846 B2
(45) Date of Patent: Aug. 30, 2016

(54) IMAGE FORMING APPARATUS THAT PERFORMS USER AUTHENTICATION BY WIRELESS COMMUNICATION, METHOD OF CONTROLLING THE SAME, AND STORAGE MEDIUM

(71) Applicant: CANON KABUSHIKI KAISHA, Tokyo (JP)

(72) Inventor: Yasuhiko Hirano, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 12 days.

(21) Appl. No.: 14/635,519

(22) Filed: Mar. 2, 2015

(65) Prior Publication Data

US 2015/0172924 A1 Jun. 18, 2015

Related U.S. Application Data

(63) Continuation of application No. 14/182,862, filed on Feb. 18, 2014, now Pat. No. 9,001,352.

(30) Foreign Application Priority Data

Feb. 22, 2013 (JP) ................................ 2013-033230

(51) Int. Cl.
*G06F 3/12* (2006.01)
*G06K 15/02* (2006.01)
(Continued)

(52) U.S. Cl.
CPC ............ *H04W 12/06* (2013.01); *G06F 1/3296* (2013.01); *G06K 15/406* (2013.01);
(Continued)

(58) Field of Classification Search
CPC ............................ G06F 3/1221; G06F 1/3284

USPC ................................................ 358/1.15, 1.11
See application file for complete search history.

(56) References Cited

U.S. PATENT DOCUMENTS

2008/0007767 A1* 1/2008 Ishimaru ................. G06F 21/35
358/1.15
2008/0152417 A1 6/2008 Heaton et al.
(Continued)

FOREIGN PATENT DOCUMENTS

JP 2010136016 A 6/2010

OTHER PUBLICATIONS

Office Action issued in U.S. Appl. No. 14/182,862, mailed Oct. 27, 2014.
Notice of Allowance issued in U.S. Appl. No. 14/182,862, mailed Dec. 5, 2014.

*Primary Examiner* — Thomas Lett
(74) *Attorney, Agent, or Firm* — Rossi, Kimms & McDowell LLP (57) ABSTRACT

An image forming apparatus capable of returning from the power saving state and performing user authentication by one action of holding an authentication card over a card reader even when the apparatus is in the power saving state. The apparatus performs short-distance wireless communication with an external device. A controller performs control processing including at least authentication processing. When short-distance wireless communication with the device is started, a short-distance wireless communication section delivers a return-starting interrupt, to the controller, receives authentication data from the device to thereby store the authentication data during returning of the apparatus. The controller performs authentication processing based on the stored authentication data after returning of the apparatus from the power saving state, and notifies the device of an authentication processing result by a different channel.

16 Claims, 11 Drawing Sheets

(51) Int. Cl.
  *H04W 12/06*   (2009.01)
  *H04N 1/44*    (2006.01)
  *G06K 15/00*   (2006.01)
  *H04N 1/00*    (2006.01)
  *G06F 1/32*    (2006.01)
(52) U.S. Cl.
  CPC ..... *G06K 15/4095* (2013.01); *H04N 1/00342* (2013.01); *H04N 1/00896* (2013.01); *H04N 1/4426* (2013.01); *Y02B 60/50* (2013.01)

(56) References Cited

U.S. PATENT DOCUMENTS

2011/0199638 A1* 8/2011 Ogino ................ H04N 1/00384
                                                    358/1.15
2012/0278643 A1* 11/2012 Nishikawa ......... H04N 1/00896
                                                    713/323

* cited by examiner

IMAGE FORMING APPARATUS THAT PERFORMS USER AUTHENTICATION BY WIRELESS COMMUNICATION, METHOD OF CONTROLLING THE SAME, AND STORAGE MEDIUM

BACKGROUND OF THE INVENTION

1. Field of the Invention

The present invention relates to an image forming apparatus, a method of controlling the same, and a storage medium, and more particularly to a technique of mode return control of an image forming apparatus from a power saving state thereof which apparatus is capable of performing short-distance wireless communication with an apparatus equipped with a short-distance wireless device.

2. Description of the Related Art

Conventionally, there has been proposed an image forming apparatuses configured to shift to a state in which power consumption is reduced (so-called power saving state) in a case where no operation request is received for a certain time period or longer. Reduction of power consumption is realized e.g. by a method of interrupting clock supply to function modules, such as a print section, which operate in a normal operation state but do not operate in the power saving state.

Further, there has also been proposed an image forming apparatus configured to perform user authentication by bringing an authentication card with an RFID (Radio Frequency IDentification) tag close to the image forming apparatus equipped with an RFID tag reader-writer.

On the other hand, for the short-distance wireless communication between the RFID tag and the RFID tag reader-writer, the standard of Near Field Communication (NFC) has come to be made use of. The NFC protocol enables not only communication between an RFID tag and an RFID tag reader-writer but also communication between reader-writers, and makes it possible to perform shifting to higher-speed communication using a different channel (so-called handover). There has been disclosed a technique that uses the NFC to thereby make it possible, for example, not only to realize short-distance wireless communication of authentication data between an authentication card and an image forming apparatus, but also to display information on the start of use of the image forming apparatus to thereby enable the user to grasp the use state of the image forming apparatus (see e.g. Japanese Patent Laid-Open Publication No. 2010-136016).

However, the RFID tag reader-writer consumes a large amount of power, and hence when the image forming apparatus is in the power saving state, the RFID tag reader-writer is in a powered-off state. Therefore, even when an authentication card with an RFID tag is brought close to the image forming apparatus, the image forming apparatus does not return from the power saving state.

Further, when the image forming apparatus is in the power saving state, the user is required to perform two actions: depressing a button on a panel of the apparatus for returning the apparatus from the power saving state, and then holding an authentication card with an RFID tag over the RFID tag reader-writer. This reduces user friendliness.

Further, in the image processing apparatus disclosed in Japanese Patent Laid-Open Publication No. 2010-136016, a time period required for the apparatus to return from the power saving state is not taken into account, and to make use of handover during authentication data communication by NFC, the apparatus is required to be not in the power saving state.

SUMMARY OF THE INVENTION

The present invention provides an image forming apparatus that is capable of returning from the power saving state and performing user authentication, by one action of holding an authentication card over a card reader, even when the apparatus is in the power saving state, a method of controlling the same, and a storage medium.

In a first aspect of the present invention, there is provided image forming apparatus that performs wireless communication with an external device, comprising a control unit configured to perform control processing including at least authentication processing, and a communication unit configured to, when wireless communication with an external device is started, deliver an interrupt signal for returning the image forming apparatus from a power saving state to the control unit, and receive authentication data from the external device to thereby store the received authentication data in the course of returning of the image forming apparatus from the power saving state, wherein the control unit performs the authentication processing based on the stored authentication data after the image forming apparatus has returned from the power saving state, and notifies the external device of a result of the authentication processing by a method different from the wireless communication.

In a second aspect of the present invention, there is provided a method of controlling an image forming apparatus that performs wireless communication with an external device, the image forming apparatus including a control unit configured to perform control processing including at least authentication processing, comprising delivering, when wireless communication with an external device is started, an interrupt signal for returning the image forming apparatus from a power saving state to the control unit, and receiving authentication data from the external device to thereby store the received authentication data in the course of returning of the image forming apparatus from the power saving state, and performing the authentication processing based on the stored authentication data after the image forming apparatus has returned from the power saving state, and notifying the external device of a result of the authentication processing by a method different from the wireless communication.

In a third aspect of the present invention, there is provided a non-transitory computer-readable storage medium storing a computer-executable program for executing a method of controlling an image forming apparatus that performs wireless communication with an external device, the image forming apparatus including a control unit configured to perform control processing including at least authentication processing, wherein the method comprises delivering, when wireless communication with an external device is started, an interrupt signal for returning the image forming apparatus from a power saving state to the control unit, and receiving authentication data from the external device to thereby store the received authentication data in the course of returning of the image forming apparatus from the power saving state, and performing the authentication processing based on the stored authentication data after the image forming apparatus has returned from the power saving state, and notifying the external device of a result of the authentication processing by a method different from the wireless communication.

According to the present invention, it is possible to return the image forming apparatus from the power saving state and perform user authentication, by one action of holding an authentication card over a card reader, even when the apparatus is in the power saving state.

Further features of the present invention will become apparent from the following description of exemplary embodiments with reference to the attached drawings.

DESCRIPTION OF THE EMBODIMENTS

The present invention will now be described in detail below with reference to the accompanying drawings showing embodiments thereof.

Figure 1:
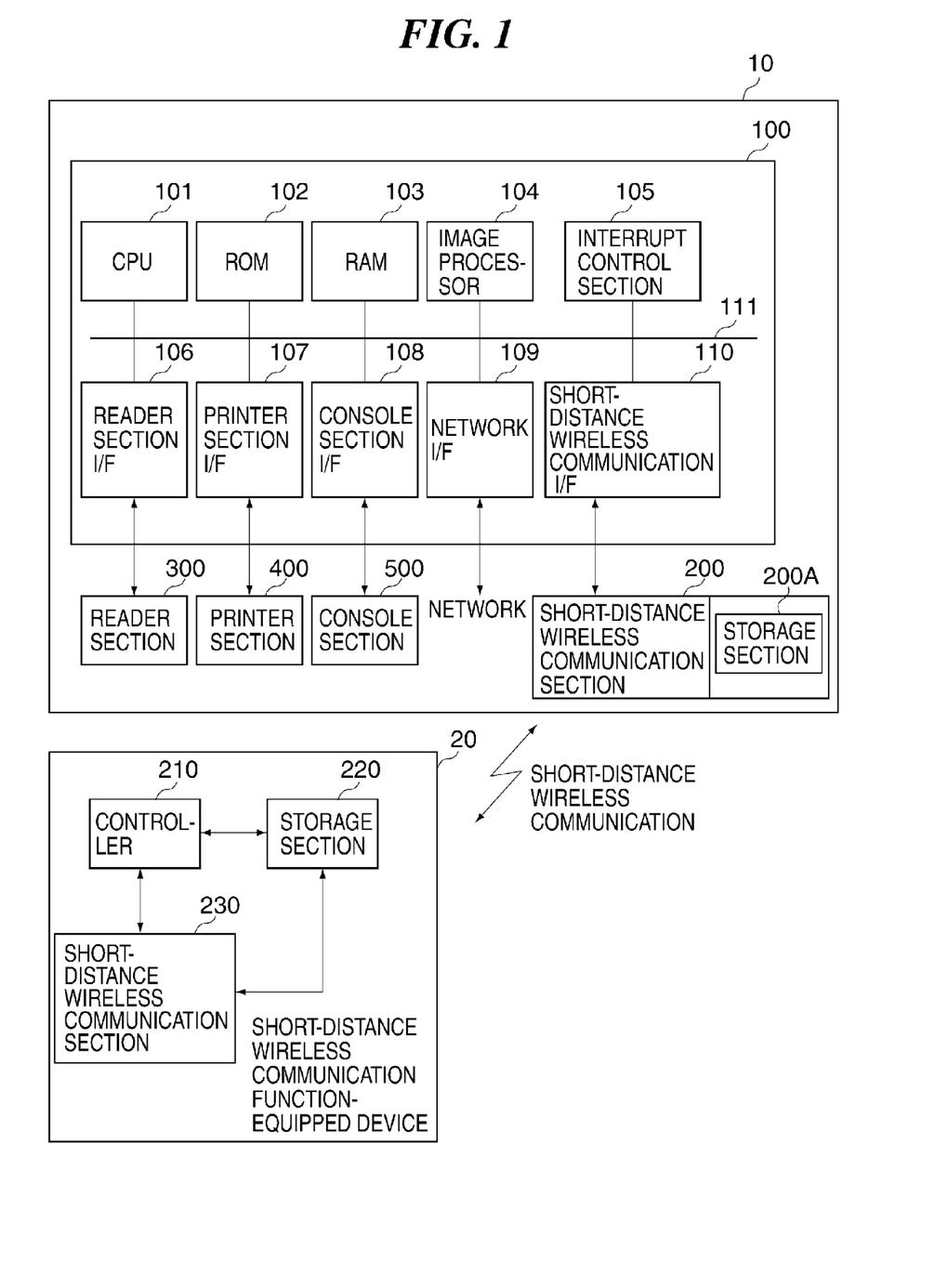
FIG. 1 is a block diagram showing the hardware configuration of an MFP as an image forming apparatus according to a first embodiment of the present invention.

FIG. 1 is a block diagram showing the hardware configuration of an image forming apparatus according to a first embodiment of the present invention.

Referring to FIG. 1, an MFP (multifunction peripheral) 10 as the image forming apparatus according to the present embodiment is capable of performing short-distance wireless communication with a device equipped with a short-distance wireless communication function (hereinafter simply referred to as the "device") 20. The device 20 (external device) is e.g. an authentication card with an RFID tag, but this is not limitative.

The MFP 10 has the following hardware configuration.

Reference numeral 100 denotes a controller that controls network communication and the overall operation of the MFP 10. Reference numeral 200 denotes a short-distance wireless communication section that controls short-distance wireless communication. The short-distance wireless communication section 200 includes a storage section 200A for storing data. Reference numeral 300 denotes a reader section that reads an image, such as that of an original. Reference numeral 400 denotes a printer section that executes print processing. Reference numeral 500 denotes a console section which is an interface provided with an operation panel, a display panel, and so on.

The controller 100 has the following hardware configuration.

Reference numeral 101 denotes a CPU that controls each of the components included in the controller 100. Reference numeral 102 denotes a ROM storing control programs executed by the CPU 101. Reference numeral 103 denotes a RAM used as an area for control programs being executed by the CPU 101, a work data area for image processing, and an output data storage area.

Reference numeral 104 denotes an image processor that performs image processing. Reference numeral 105 denotes an interrupt control section that controls an interrupt from each of the components included in the controller 100. Reference numeral 106 denotes a reader section interface that controls data communication with the reader section 300. Reference numeral 107 denotes a printer section interface that controls data communication with the printer section 400. Reference numeral 108 denotes a console section interface that controls data communication with the console section 500. Reference numeral 109 denotes a network interface that controls network communication. The MFP 10 is connected e.g. to a PC and a server, neither of which is shown, via a network connected to the network interface 109. Reference numeral 110 denotes a short-distance wireless communication section interface that controls data communication with the short-distance wireless communication section 200. These components 101 to 110 within the controller 100 are connected to each other via a bus 111.

The device 20 has the following hardware configuration.

Reference numeral 210 denotes a controller that controls the overall operation of the device 20. Reference numeral 220 denotes a storage section that stores e.g. authentication data of the device 20. Reference numeral 230 denotes a short-distance wireless communication section that controls short-distance wireless communication.

Next, a description will be given of a process for returning the MFP 10 from a power saving state, which is executed when the MFP 10 in the power saving state performs short-distance wireless communication with the device 20.

When the MFP 10 has shifted to the power saving state, the MFP 10 enters a state where electric power is supplied only to the console section interface 108, the network interface 109, the short-distance wireless communication section interface 110, the short-distance wireless communication section 200, and the console section 500, and is not supplied to the components other than these.

Figure 2:
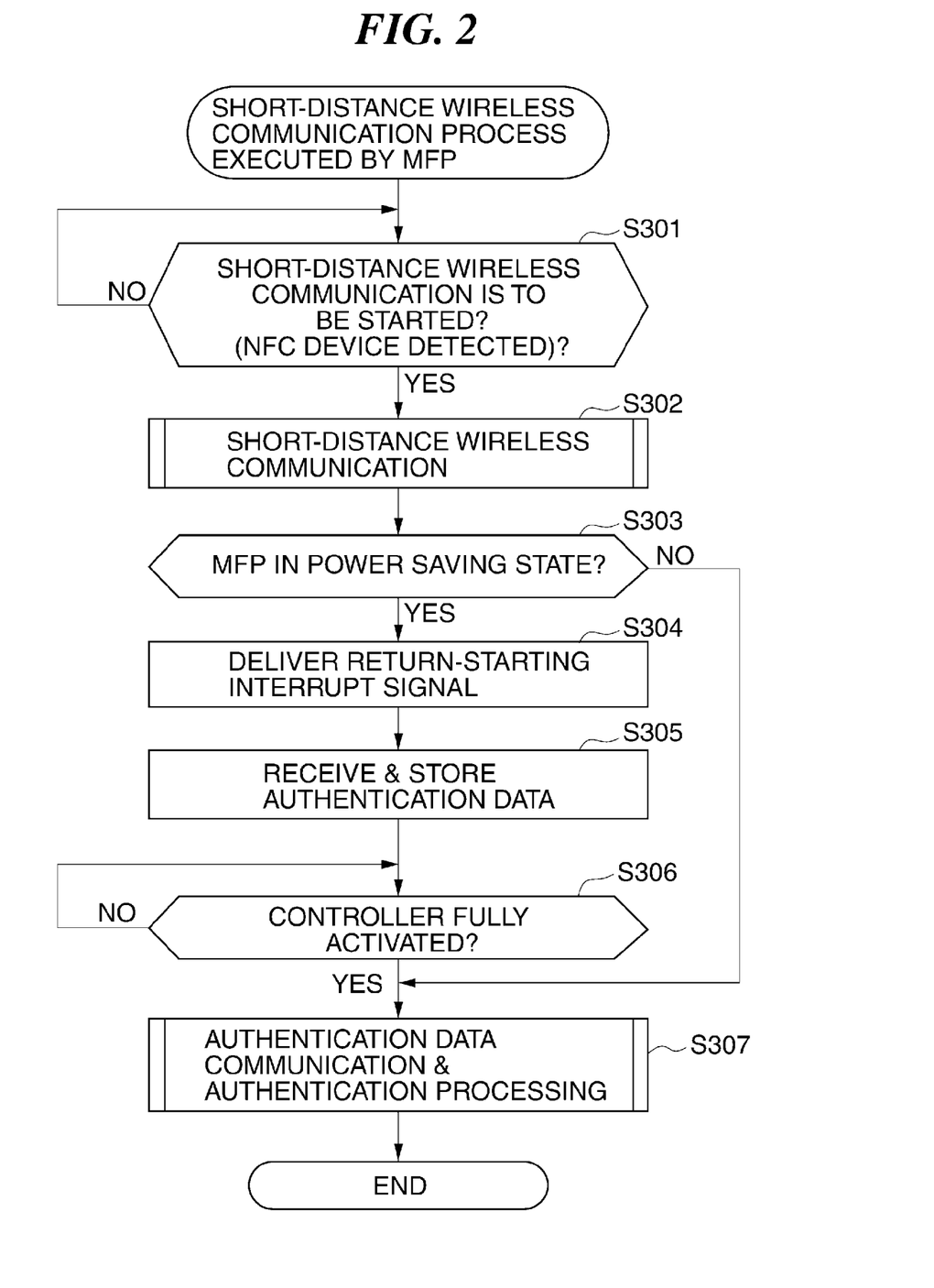
FIG. 2 is a flowchart of a short-distance wireless communication process executed by the MFP in a power saving state.

FIG. 2 is a flowchart of a short-distance wireless communication process executed by the MFP 10 in the power saving state. Note that in the processes described hereafter, each process performed by the MFP 10 is realized by an associated control program, stored in the ROM 102 or loaded into the RAM 103, which is executed by the CPU 101 of the controller 100. On the other hand, each process performed by the device 20 is realized by the controller 210 executing a control command received from the MFP 10 via the short-distance wireless communication section 230.

First, when the short-distance wireless communication section 200 detects proximity of the device 20 (YES to a step S301), short-distance wireless communication is started between the short-distance wireless communication section 200 and the device 20 (step S302). At this time, the short-distance wireless communication section 200 sends a query about the state of the MFP 10 to the controller 100, and if it is determined in a step S303 that the MFP 10 is not in the power saving state, the short-distance wireless communication section 200 proceeds to a step S307. On the other hand, if it is determined in the step S303 that the MFP 10 is in the power saving state, the short-distance wireless communication section 200 outputs a return-starting interrupt signal to the controller 100 (step S304).

Next, the short-distance wireless communication section 200 receives authentication data from the device 20 by short-distance wireless communication, and stores the received authentication data (step S305).

Next, when the controller 100 has returned from the power saving state, i.e. has been fully activated (YES to a step S306), the short-distance wireless communication section 200 transfers the authentication data stored in the step S305 to the controller 100, and authentication processing is performed by the controller 100 (step S307).

Next, a flow of data communication between the device 20, the short-distance wireless communication section 200 of the MFP 10, and the controller 100 of the same will be described with reference to FIG. 3.

Figure 3:
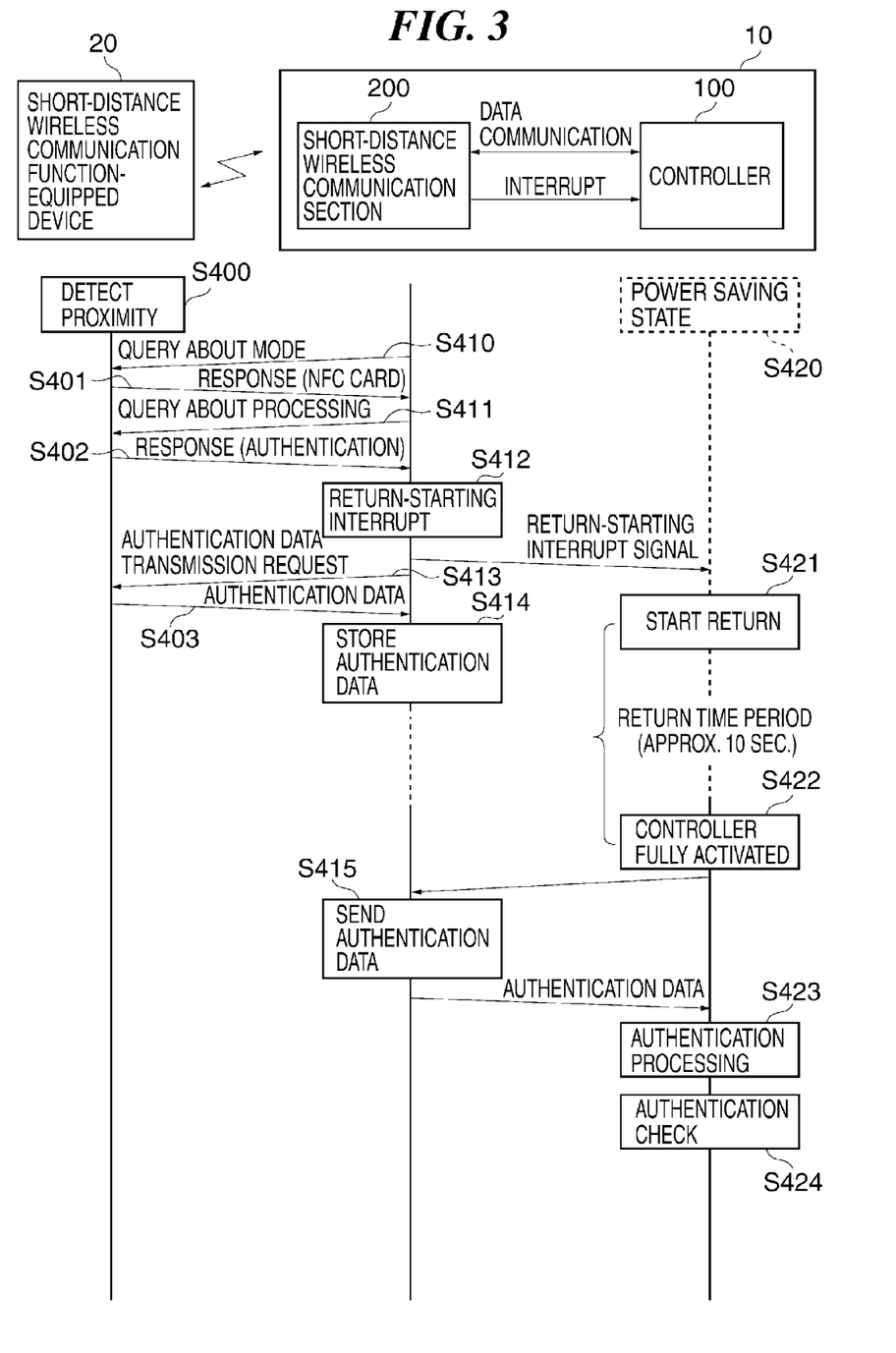
FIG. 3 is a sequence diagram showing details of processing executed during short-distance wireless communication between the MFP in the power saving state and a device.

FIG. 3 is a sequence diagram showing details of processing executed during short-distance wireless communication between the device 20 and the MFP 10 in the power saving state.

Referring to FIG. 3, when the short-distance wireless communication section 200 of the MFP 10 detects proximity of the device 20 (S400), the short-distance wireless communication section 200 sends a query about the mode of the short-distance wireless communication to the device 20 (S410).

The device 20 notifies the short-distance wireless communication section 200 of an NFC card mode (card emulation mode) as a response to the query about the mode of the short-distance wireless communication (S401).

Next, the short-distance wireless communication section 200 of the MFP 10 sends a query about short-distance wireless communication processing (S411).

The device 20 notifies the short-distance wireless communication section 200 of authentication processing as a response to the query about the short-distance wireless communication processing (S402).

Figure 4A:
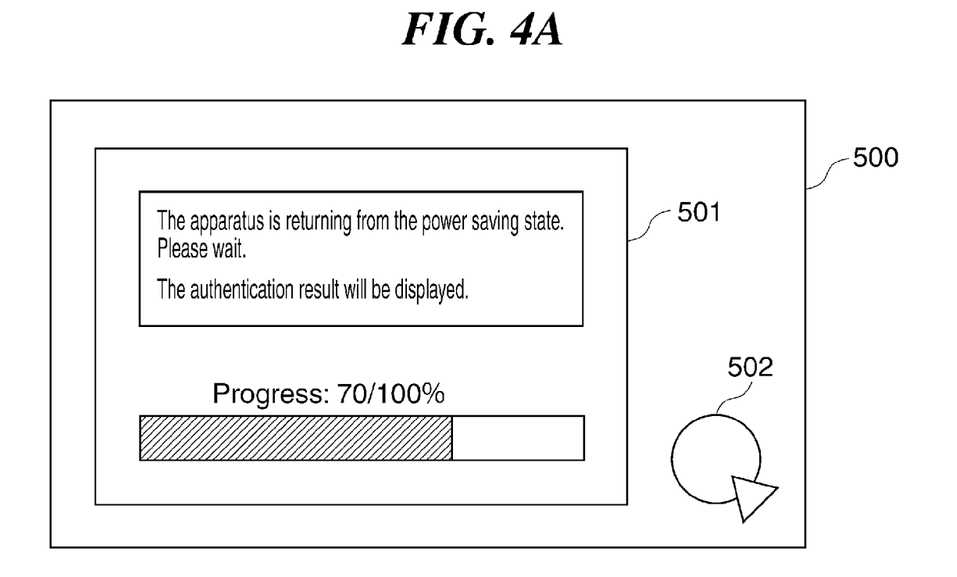
FIG. 4A is a diagram showing an example of a display screen displayed on a console section until a controller is fully activated.

Next, when the short-distance wireless communication section 200 delivers a return-starting interrupt signal to the controller 100 (S412), a message shown in FIG. 4A to the effect that the MFP 10 is returning from the power saving state is displayed on a panel 501 of the console section 500 until the controller 100 has been fully activated. The time period from the start of return of the controller 100 (S421) from the power saving state (S420) to the completion of the full activation of the controller 100 (S422) is a return time period required to return from the power saving state. In the present embodiment, it is assumed that the return time period is approximately 10 seconds.

On the other hand, the short-distance wireless communication section 200 sends a request for transmission of authentication data, to the device 20 (S413). The device 20 sends the authentication data in response to the request for transmission of authentication data (S403). The short-distance wireless communication section 200 having received the authentication data stores the received authentication data in the storage section 200A thereof (S414).

Next, when the controller 100 has returned from the power saving state, i.e. has been fully activated (S422), the short-distance wireless communication section 200 transfers the authentication data stored in the storage section 200A to the controller 100 (S415).

Figure 4B:
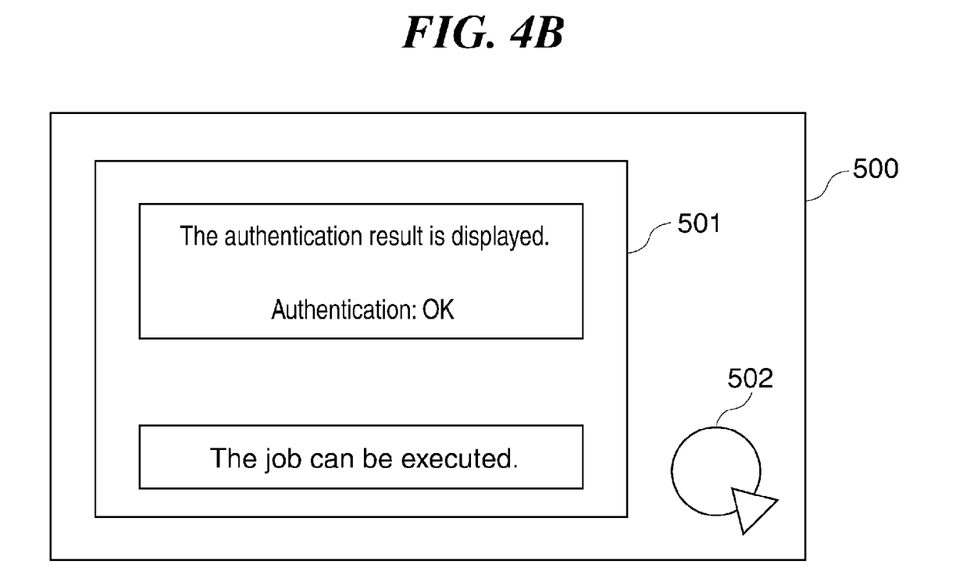
FIG. 4B is a diagram showing an example of a screen displaying a result of authentication processing.

The controller 100 executes authentication processing using the received authentication data (5423), and when the authentication processing is completed, the controller 100 displays an authentication result shown in FIG. 4B on the panel 501 of the console section 500 (S424). In FIGS. 4A and 4B, reference numeral 501 denotes the panel, and reference numeral 502 denotes an operation button.

As described above, when the MFP 10 to which the device 20, such as an authentication card, is brought close is in the power saving state, the short-distance wireless communication section 200 of the MFP 10 delivers the return-starting interrupt signal to the controller 100, receives the authentication information from the device 20, and stores the received authentication information in the storage section 200A. Then, authentication processing is executed after the controller 100 is fully activated. This makes it possible to return the MFP 10 from the power saving state and perform user authentication by one action of holding the authentication card over the card reader even when the image forming apparatus is in the power saving state.

Next, a second embodiment of the present invention will be described. The second embodiment has the same configuration as that of the first embodiment described with reference to FIGS. 1 and 2. The same components as those of the first embodiment are denoted by the same reference numerals, and description thereof is omitted, while only components different from those of the first embodiment will be described hereafter.

The second embodiment differs from the first embodiment in a method of displaying information exchanged by short-distance wireless communication and a result of authentication processing, because the device 20 is equipped with a different channel communication unit and a display unit. The different channel communication unit refers to a communication unit which is higher in data communication speed than NFC, such as a WLAN (Wireless LAN) and Bluetooth (registered trademark). The display unit refers to a liquid crystal display panel or the like and is assumed to be connected to the controller 210 and the short-distance wireless communication section 230. A short-distance wireless communication process executed by the MFP 100 in the power saving state is the same as that described hereinabove with reference to FIG. 2, and hence description thereof is omitted.

Figure 5:
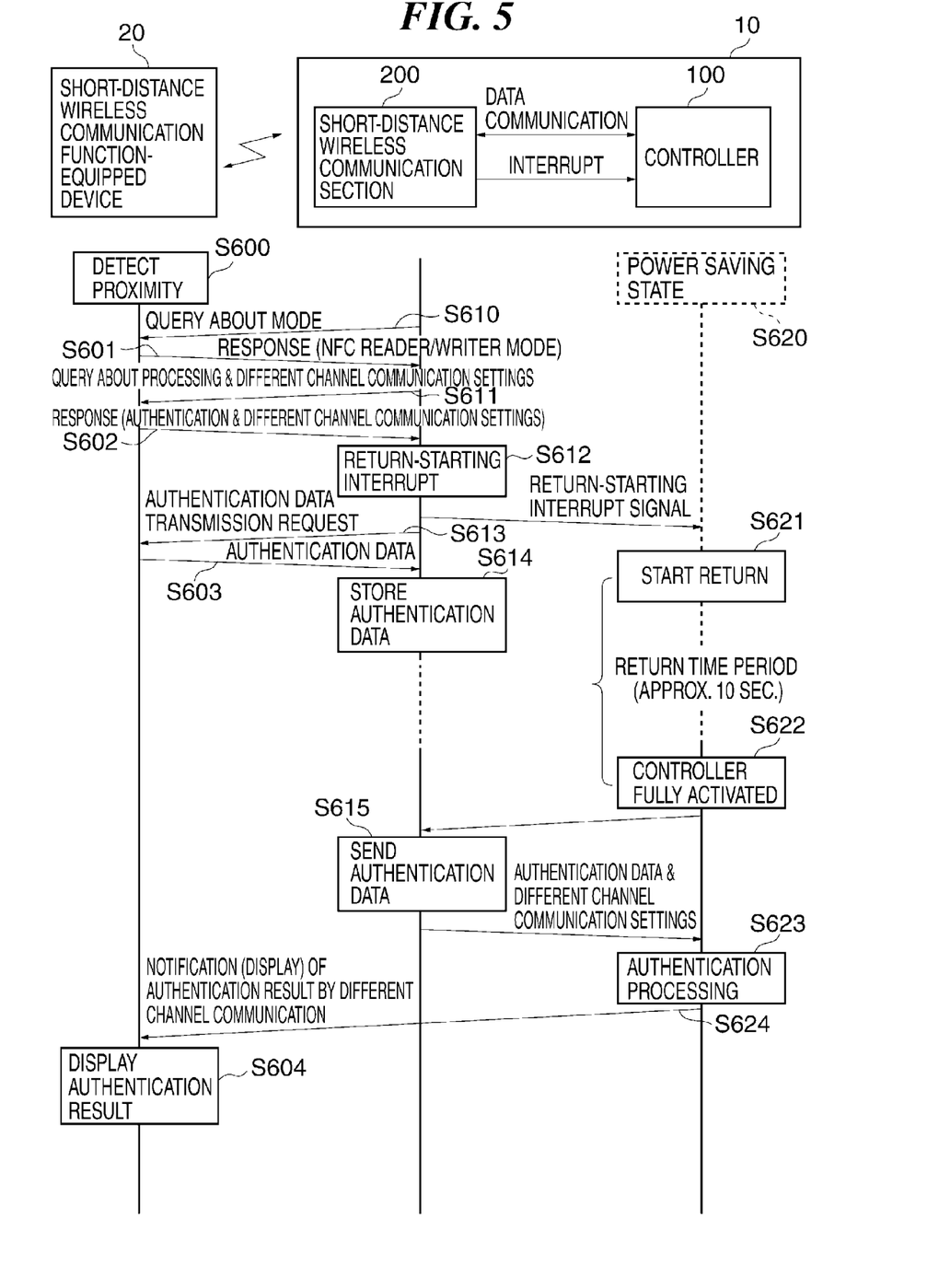
FIG. 5 is a sequence diagram showing details of processing executed during short-distance wireless communication between a device and an MFP in the power saving state as an image forming apparatus according to a second embodiment of the present invention.

FIG. 5 is a sequence diagram showing details of processing executed during short-distance wireless communication between the device 20 and the MFP 10 according to the second embodiment in the power saving state.

Referring to FIG. 5, when the short-distance wireless communication section 200 of the MFP 10 detects proximity of the device 20 (S600), the short-distance wireless communication section 200 sends a query about a mode of short-distance wireless communication to the device 20 (S610).

The device 20 notifies the short-distance wireless communication section 200 of an NFC reader/writer mode as a response to the query about the short-distance wireless communication mode (S601).

Next, the short-distance wireless communication section 200 of the MFP 10 sends a query about short-distance wireless communication processing and different channel communication settings (S611).

The device 20 notifies the short-distance wireless communication section 200 of authentication processing and information (e.g. an IP address and a host name) of the different channel communication settings (e.g. WLAN communication settings) as a response to the query received in the step S611 (S602).

Next, when the short-distance wireless communication section 200 delivers a return-starting interrupt signal to the controller 100 (S612), a message shown in FIG. 4A to the effect that the MFP 10 is returning from the power saving state is displayed on the panel 501 of the console section 500 until the controller 100 has been fully activated. A time period from the start of return of the controller 100 (S621) from the power saving state (S620) to the completion of the full activation of the controller 100 (S622) is a return time period required to return from the power saving state. In the present embodiment, it is assumed that the return time period is approximately 10 seconds.

On the other hand, the short-distance wireless communication section 200 sends a request for transmission of authentication data, to the device 20 (S613). The device 20 sends the authentication data in response to the request for transmission of authentication data (S603). The short-distance wireless communication section 200 having received the authentication data stores the received authentication data in the storage section 200A thereof (S614).

Next, when the controller 100 has returned from the power saving state, i.e. has been fully activated (S622), the short-distance wireless communication section 200 transfers the authentication data and the different channel communication settings stored in the storage section 200A thereof to the controller 100 (S615).

The controller 100 executes authentication processing using the received authentication data (S623), and when the authentication processing is completed, the controller 100 notifies the device 20 of the authentication result by different channel communication (S624).

The device 20 displays the authentication result shown in FIG. 4B on the display unit, such as the liquid crystal display panel (S604). Note that if the authentication has failed, information indicative of the authentication failure is displayed on the liquid crystal display panel.

Next, details of processing executed by the short-distance wireless communication section 200 and the device 20 during the short-distance wireless communication described with reference to FIG. 5 will be described, respectively.

Figure 6:
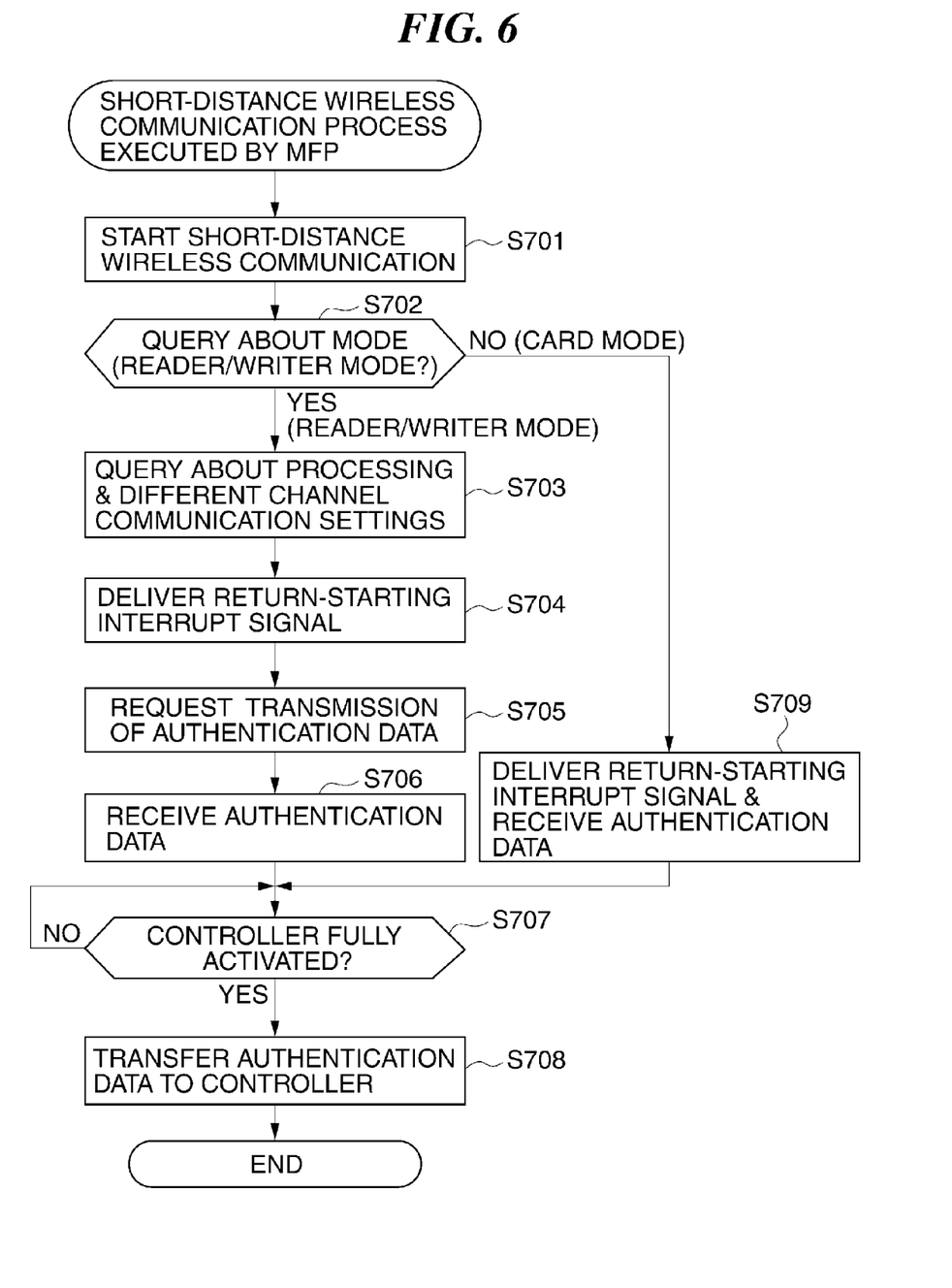
FIG. 6 is a flowchart of a short-distance wireless communication process executed by a short-distance wireless communication section of the MFP during short-distance wireless communication with the device.

FIG. 6 is a flowchart of a short-distance wireless communication process executed by the short-distance wireless communication section 200 of the MFP 10 during short-distance wireless communication with the device 20.

After starting the short-distance wireless communication by detecting proximity of the device (NFC device) 20 (step S701), the short-distance wireless communication section 200 sends a query about the mode of the short-distance wireless communication to the device 20 (step S702). Note that the mode refers to an operation mode of NFC, which is either a reader/writer mode or a card (card emulation) mode.

If the response from the device 20 to the query about the mode is the reader/writer mode (YES to the step S702), the short-distance wireless communication section 200 proceeds to a step S703. On the other hand, if the response from the device 20 to the query about the mode is the card mode (NO to the step S702), the short-distance wireless communication section 200 delivers a return-starting interrupt signal to the controller 100 (step S709). Also in the step S709, by limiting in advance authentication processing to be requested by the device 20 to the authentication processing, the short-distance wireless communication section 200 receives authentication data from the device 20, and then proceeds to a step S707.

In the step S703, the short-distance wireless communication section 200 sends a query about short-distance wireless communication processing and different channel communication settings to the device 20. Next, the short-distance wireless communication section 200 delivers a return-starting interrupt signal to the controller 100 (step S704), and then sends a request for transmission of authentication data, to the device 20 (step S705).

Next, the short-distance wireless communication section 200 receives authentication data from the device 20 (step S706). At this time, if the controller 100 has returned from the power saving state, i.e. has been fully activated (YES to the step S707), the short-distance wireless communication section 200 transfers the authentication data to the controller 100 (step S708), followed by terminating the present process.

Figure 7:
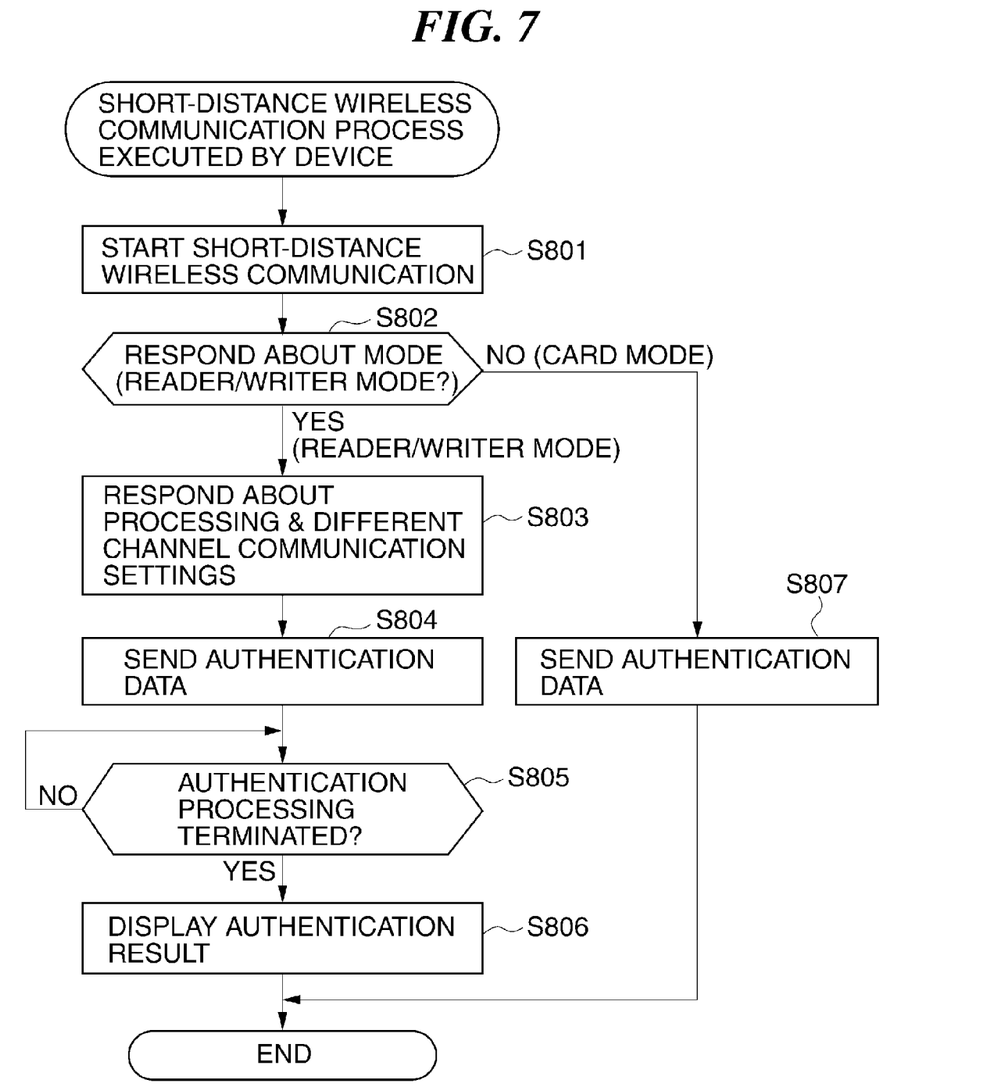
FIG. 7 is a flowchart of a short-distance wireless communication process executed by the device during short-distance wireless communication with the MFP.

FIG. 7 is a flowchart of a short-distance wireless communication process executed by the device 20 during short-distance wireless communication with MFP 10.

After starting the short-distance wireless communication by detecting proximity of the MFP (NFC device) 10 (step S801), the device 20 notifies the short-distance wireless communication section 200 of the MFP 10 of the operation mode of its own as a response to the query about the mode (step S802). If the response from the device 20 to the query about the mode is the reader/writer mode (YES to the step S802), the device 20 notifies the short-distance wireless communication section 200 of the MFP 10 of the authentication processing and the WLAN communication settings as a response to the query about the short-distance wireless communication processing and the different channel communication settings (step S803).

Next, the device 20 transmits the authentication data to the short-distance wireless communication section 200 of the MFP 10 (step S804). If an authentication processing result notification is received from the controller 100 of the MFP 10 by different channel communication (YES to a step S805), the device 20 displays the authentication result on the display unit, such as a liquid crystal display panel (step S806).

On the other hand, in the step S802, if the response from the device 20 to the query about the mode is the card mode (NO to the step S802), the device 20 transmits the authentication data to the short-distance wireless communication section 200 of the MFP 10 (step S807), followed by terminating the present process.

As described above, according to the second embodiment, it is possible to establish communication via a different channel without making troublesome communication settings even after authentication data has been transmitted by NFC, which makes it possible to improve the user friendliness of a short-distance wireless communication function-equipped device.

Next, a third embodiment of the present invention will be described. The third embodiment has the same configuration as that of the first and second embodiments described with reference to FIGS. 1 and 2. The same components as those of the first and second embodiments are denoted by the same reference numerals, and description thereof is omitted, while only components different in construction from those of the first and second embodiments will be described hereafter.

In the third embodiment, the device 20 is a mobile device, such as a smartphone, in which an application (e.g. application for mobile printing) is installed. Further, similarly to the second embodiment, the device 20 includes a different channel communication unit (which is higher in data communication speed than NFC, such as a WLAN and Bluetooth (registered trademark)), and a display unit, such as a liquid crystal display panel.

Note that the authentication data communication and the authentication processing are the same as those in the second embodiment, and hence detailed description thereof is omitted. Further, the short-distance wireless communication process executed by the MFP 10 in the power saving state is the same as that described with reference to FIG. 2, and hence description thereof is omitted.

Figure 8:
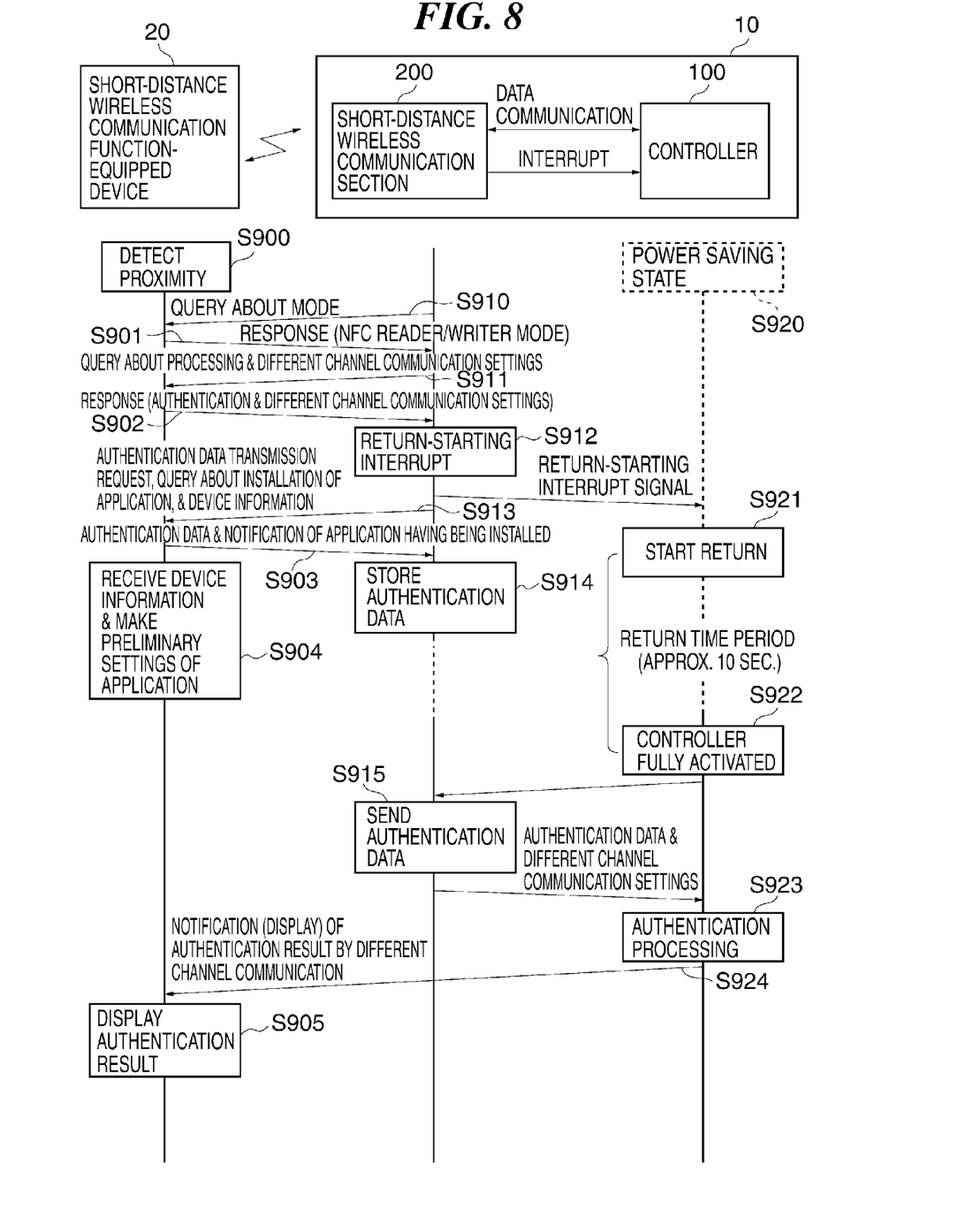
FIG. 8 is a sequence diagram showing details of processing executed during the short-distance wireless communication between a device and an MFP in the power saving state as an image forming apparatus according to a third embodiment of the present invention.

FIG. 8 is a sequence diagram showing details of processing executed during the short-distance wireless communication between the device 20 and the MFP 10 according to the third embodiment in the power saving state.

Referring to FIG. 8, when the short-distance wireless communication section 200 of the MFP 10 detects proximity of the device 20 (S900), the short-distance wireless communication section 200 sends a query about the mode of the short-distance wireless communication to the device 20 (S910).

Next, the device 20 notifies the short-distance wireless communication section 200 of the NFC reader/writer mode as a response to the query about the short-distance wireless communication mode (S901).

Next, the short-distance wireless communication section 200 of the MFP 10 sends a query about the short-distance wireless communication processing and the different channel communication settings (step S911).

The device 20 notifies the short-distance wireless communication section 200 of authentication processing and information of the different channel communication settings (e.g. WLAN communication settings) as a response to the query received in the step S911 (step S902).

Next, the short-distance wireless communication section 200 delivers a return-starting interrupt signal to the controller 100 (S912), and then sends a request for transmission of authentication data and a query about whether an application is installed and the device information, to the device 20 (S913). The device information includes the specification of the MFP 10 (color/monochrome printing compatibility, double-sided printing capability, and printable sheet sizes (A3, A4)), a state of sheets to be fed, and so forth, but these are not limitative.

Next, the device 20 sends the authentication data and a response to the effect that the application is installed, as a response to the query about whether the application is installed (S903), receives the device information, and makes preliminary settings of the application based on the received device information (S904). Steps S905, S914, S915, S920, S921, S922, S923, and S924 are the same as the steps S604, S614, S615, S620, S621, S622, S623, and S624 in FIG. 5, and hence description thereof is omitted.

Next, details of processing executed by the short-distance wireless communication section 200 and the device 20 during the short-distance wireless communication described with reference to FIG. 8 will be described, respectively.

Figure 9:
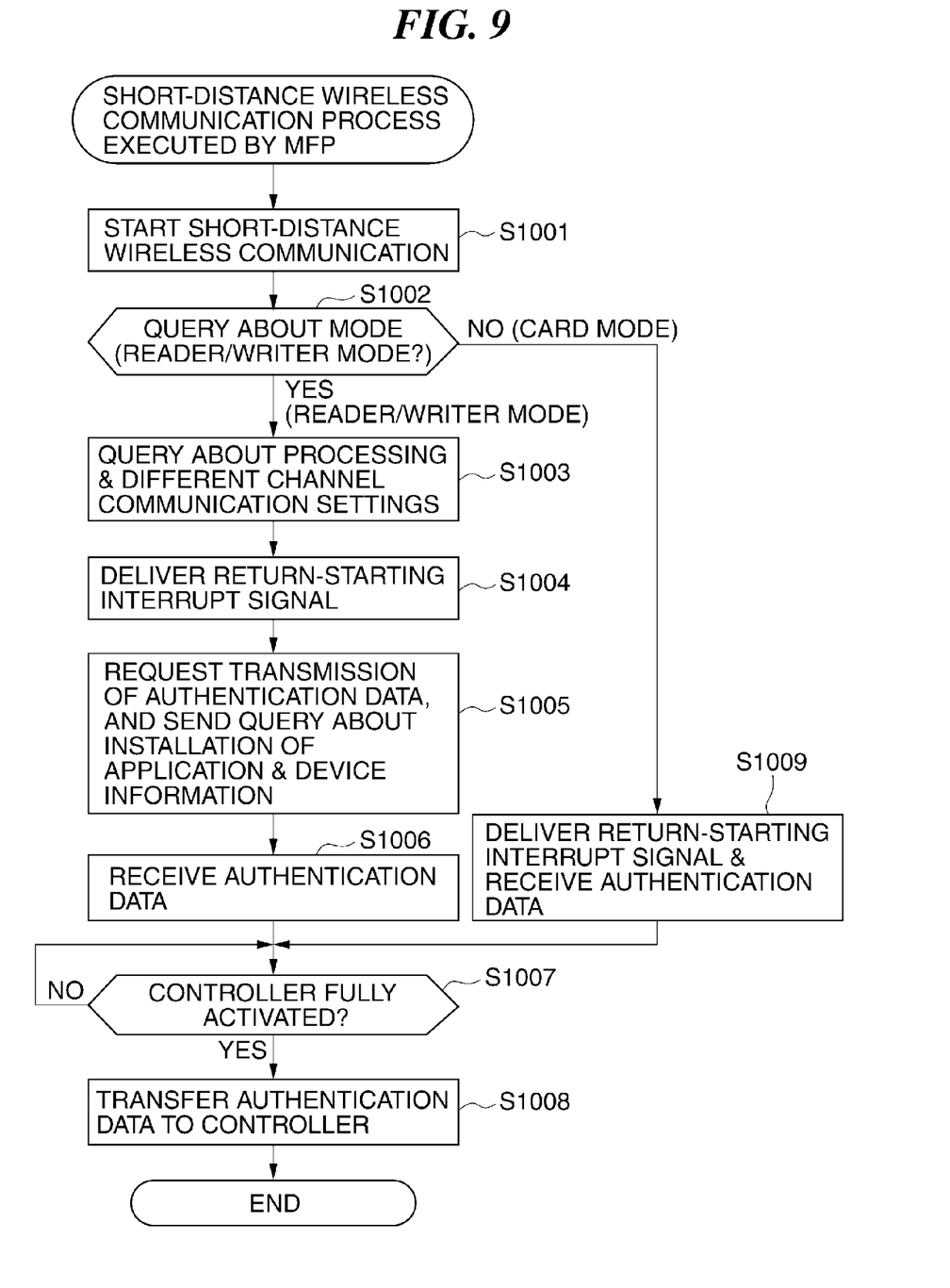
FIG. 9 is a flowchart of a short-distance wireless communication process executed by the short-distance wireless communication section of the MFP during short-distance wireless communication with the device.

FIG. 9 is a flowchart of a short-distance wireless communication process executed by the short-distance wireless communication section 200 of the MFP 10 during the short-distance wireless communication with the device 20.

After starting the short-distance wireless communication by detecting proximity of the device (NFC device) 20 (S1001), the short-distance wireless communication section 200 sends a query about the mode of the short-distance wireless communication to the device 20 (S1002). Note that the mode refers to an operation mode of NFC, which is a reader/writer mode or a card (card emulation) mode.

If the response from the device 20 to the query about the mode is the reader/writer mode (YES to the step S1002), the short-distance wireless communication section 200 proceeds to a step S1003. On the other hand, if the response from the device 20 to the query about the mode is the card mode (NO to the step S1002), the short-distance wireless communication section 200 delivers a return-starting interrupt signal to the controller 100 (step S1009). Also in the step S1009, by limiting in advance processing to be requested by the device 20 to the authentication processing, the short-distance wireless communication section 200 receives authentication data from the device 20, and then proceeds to a step S1007.

In the step S1003, the short-distance wireless communication section 200 sends a query about the short-distance wireless communication processing and the different channel communication settings to the device 20. Next, the short-distance wireless communication section 200 delivers a return-starting interrupt signal to the controller 100 (step S1004).

Next, the short-distance wireless communication section 200 sends a request for transmission of authentication data, as well as a query about whether an application is installed and device information, to the device 20 (step S1005).

Next, the short-distance wireless communication section 200 receives the authentication data from the device 20 (step S1006). At this time, if the controller 100 has returned from the power saving state, i.e. has been fully activated (YES to the step S1007), the short-distance wireless communication section 200 transfers the authentication data to the controller 100 (step S1008), followed by terminating the present process.

Figure 10:
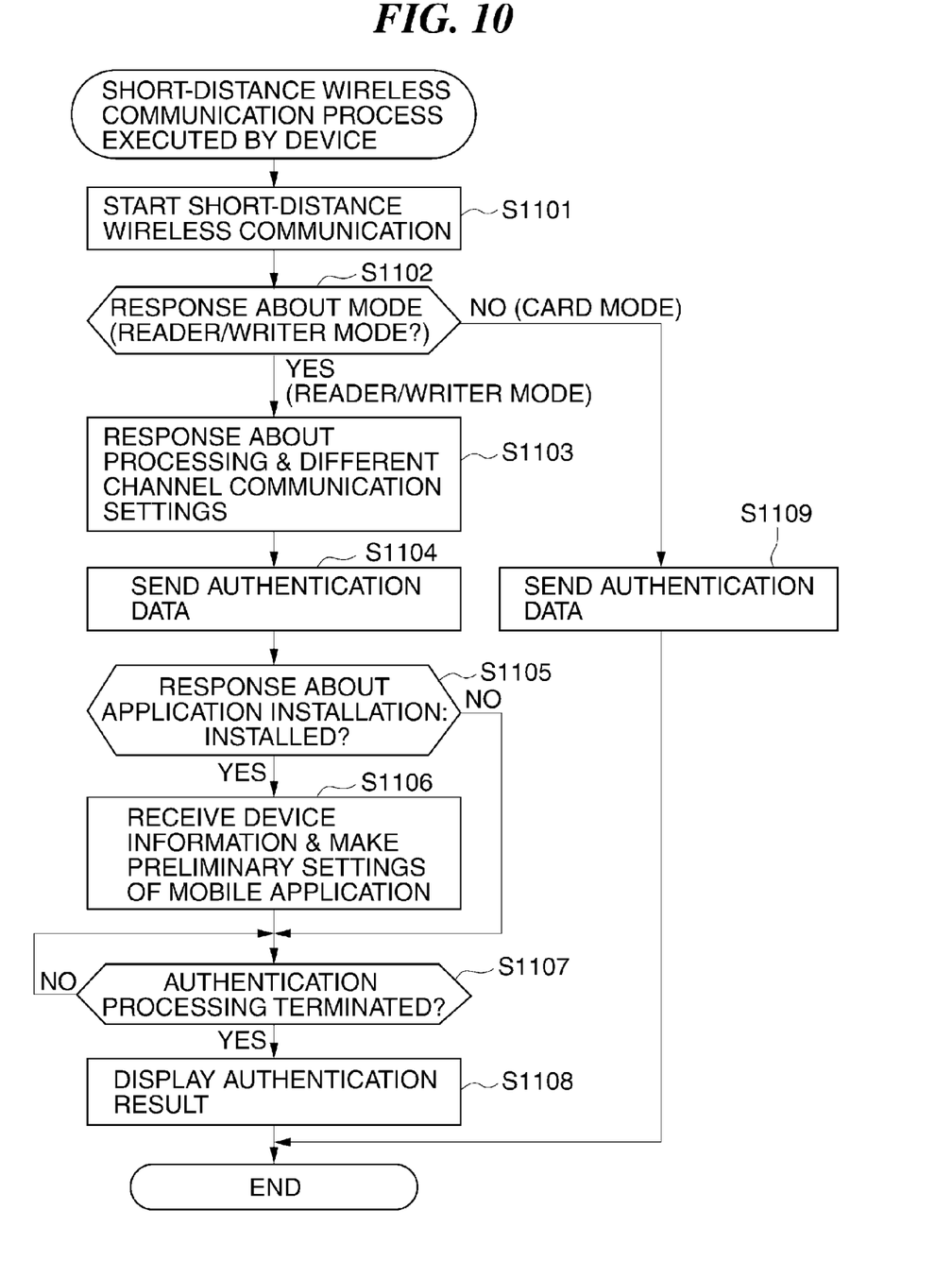
FIG. 10 is a flowchart of a short-distance wireless communication process executed by the device during short-distance wireless communication with the MFP.

FIG. 10 is a flowchart of a short-distance wireless communication process executed by the device 20 during the short-distance wireless communication with the MFP 10.

After starting the short-distance wireless communication by detecting proximity of the MFP (NFC device) 10 (step S1101), the device 20 notifies the short-distance wireless communication section 200 of the MFP 10 of the operation mode of its own as a response to the query about the mode (step S1102). If the response from the device 20 to the query about the mode is the reader/writer mode (YES to the step S1102), the device 20 notifies the short-distance wireless communication section 200 of the MFP 10 of the authentication processing and the WLAN communication settings as a response to the query about the short-distance wireless communication processing and the different channel communication settings (step S1103).

Next, the device 20 transmits the authentication data to the short-distance wireless communication section 200 of the MFP 10 (step S1104).

Next, if it is determined that an application is installed in the device 20 (YES to a step S1105), the device 20 receives the device information from the short-distance wireless communication section 200 of the MFP 10, and makes preliminary settings of the application (step S1106). At this time, if an authentication processing result notification has been received from the controller 100 of the MFP 10 by different channel communication (YES to a step S1107), the authentication result is displayed on the display unit, such as a liquid crystal display panel (step S1108).

On the other hand, if the response from the device 20 to the query about the mode is the card mode (NO to the step S1102), the device 20 transmits the authentication data to the short-distance wireless communication section 200 of the MFP 10 (step S1109), followed by terminating the present process.

As described above, in the course of returning of the MFP 10 from the power saving state, the device 20 receives the device information of the MFP 10, and makes preliminary settings of the installed application based on the received device information. With this configuration, even when the image forming apparatus is in the power saving state, only by bringing a mobile device, such as a smartphone, close to the image forming apparatus, it is possible to return the image forming apparatus from the power saving state, and make preliminary settings of the application installed in the mobile device.

Figure 11:
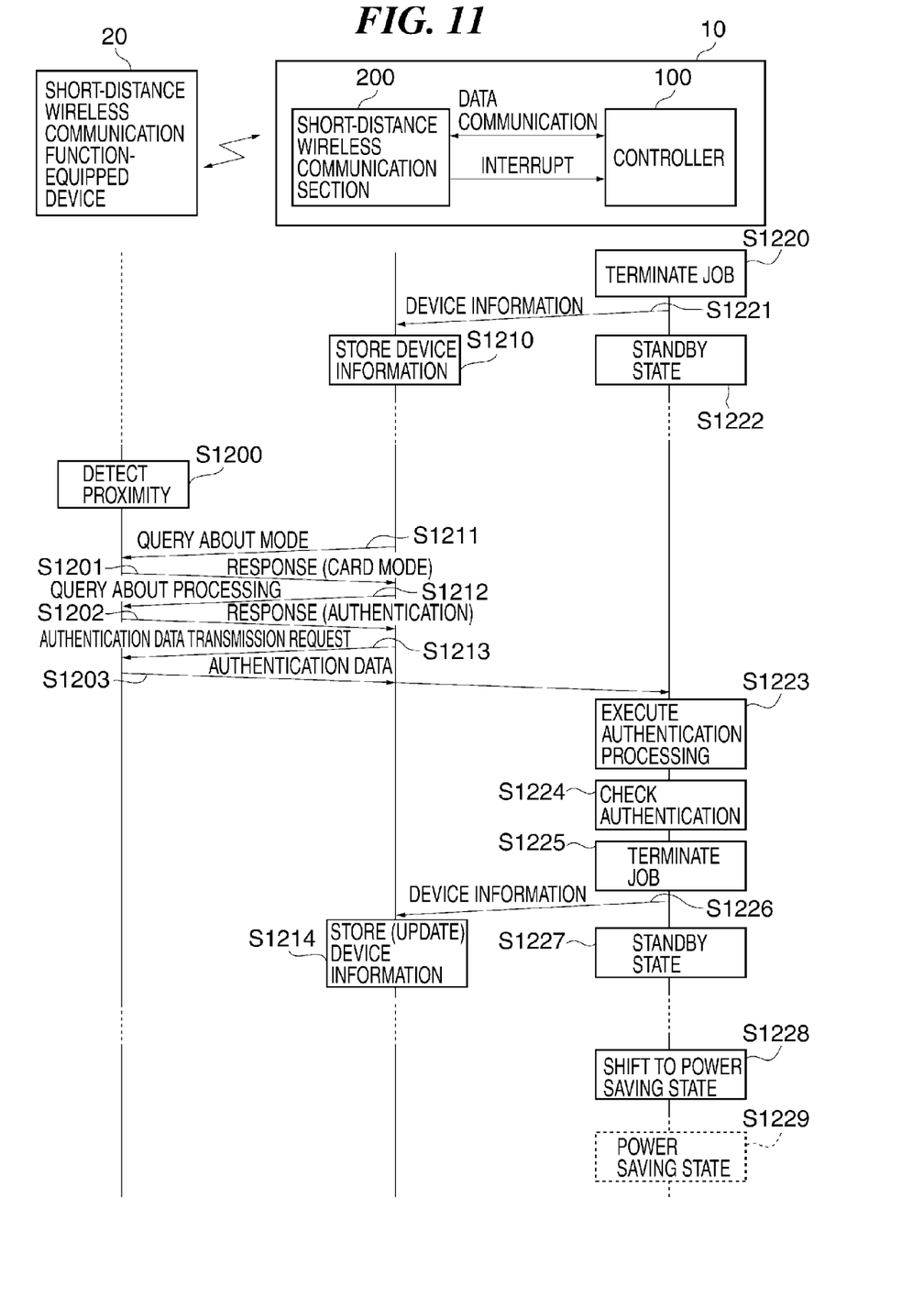
FIG. 11 is a sequence diagram showing a flow of processing for updating device information stored in the short-distance wireless communication section of the MFP.

FIG. 11 is a sequence diagram showing a flow of processing for updating device information stored in the short-distance wireless communication section 200 of the MFP 100. The illustrated example shows operations of the MFP 10 and the device 20 in a case where the MFP 10 is not in the power saving state (but is in a standby state).

When a job is terminated (S1220), the controller 100 of the MFP 10 transmits the device information to the short-distance wireless communication section 200 (S1221), and shifts to the standby state (S1222).

Next, when the short-distance wireless communication section 200 of the MFP 10 receives the device information from the controller 100, the short-distance wireless communication section 200 stores the received device information in the storage section 220 (S1210).

The short-distance wireless communication starting from detection of proximity of the device 20 (S1200) is the same as that described with reference to FIG. 3, and hence description of steps S1211, S1201, S1212, S1202, and S1213 is omitted. Since the MFP 10 is not in the power saving state (but is in the standby state), the authentication data transmitted from the device 20 (S1203) is immediately transferred from the short-distance wireless communication section 200 of the MFP 10 to the controller 100. Then, the controller 100 of the MFP 10 performs authentication processing (S1223), checks the authentication result (S1224), and after terminating the job (S1225), updates the device information (e.g. changes the state of sheets to be fed), transmits the updated device information to the short-distance wireless communication section 200 (S1226), and then enters the standby state (S1227).

The short-distance wireless communication section 200 of the MFP 10 stores the received device information e.g. in the storage section 200A thereof (S1214). Then, the controller 100 of the MFP 10 shifts to the power saving state (S1228) to be in the power saving state (S1229).

As described above, whenever a job is terminated in the MFP 10, the device information stored in the storage section 200A of the short-distance wireless communication section 200 is updated, and hence it is possible to transmit the latest device information to the device 20 which has been brought close to the MFP 10.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-033230, filed Feb. 22, 2013, which is hereby incorporated by reference herein in its entirety.

What is claimed is:

1. An image forming apparatus comprising:
a near field communicator having a memory;
a console; and
a controller configured to control the image forming apparatus,
wherein the near field communicator is configured to detect receipt of authentication data from a mobile device via near field communication, store the authentication data in the memory, and output a first signal to the controller,
wherein the controller is configured to return the image forming apparatus from a power saving mode in accordance with the first signal and, after the image forming apparatus has returned from the power saving mode, output a second signal to the near field communicator,
wherein the near field communicator is configured to transfer the authentication data to the controller in accordance with the second signal, and
wherein the controller is configured to authenticate a user of the mobile device using the authentication data and display a message that a job can be executed on the console.

2. The image forming apparatus according to claim 1, wherein the controller displays a result of the authentication on the console.

3. The image forming apparatus according to claim 2, wherein the controller displays, on the console, a message that the image forming apparatus is returning from the power saving mode.

4. The image forming apparatus according to claim 3, wherein the controller displays, on the console, a state of progress of the returning process from the power saving mode.

5. The image forming apparatus according to claim 1, wherein the near field communicator sends a query about a mode to the mobile device, and acquires the authentication data, as a response to the query about the mode, from the mobile device when the near field communicator receives information specifying a near field communication card mode.

6. The image forming apparatus according to claim 1, wherein in the power saving mode, power is supplied to the near field communicator while power is not supplied to the controller.

7. The image forming apparatus according to claim 1, wherein the controller is configured to perform an authentication process to authenticate the user of the mobile device after outputting the second signal to the near field communicator and after receiving the authentication data transferred from the near field communicator.

8. The image forming apparatus according to claim 1, wherein the near field communicator is configured to output the first signal in a case where the controller is operating in the power saving mode in which power is not supplied to controller, and the controller is configured to output the second signal after returning from the power saving mode to a fully activated state.

9. The image forming apparatus according to claim 1, wherein the near field communicator does not transfer the stored authentication data to the controller until the near field communicator receives the second signal output from the controller.

10. The image forming apparatus according to claim 1, wherein the near field communicator is configured to output the first signal to the controller before storing the authentication data in the memory.

11. A method of operating an image forming apparatus including a near field communicator, a console, and a controller configured to control the image forming apparatus, the method comprising:
    detecting, by the near field communicator, receipt of authentication data from a mobile device via near field communication, storing the authentication data in a memory, and outputting a first signal to the controller;
    returning, by the controller, the image forming apparatus from a power saving mode in accordance with the first signal and, after the image forming apparatus has returned from the power saving mode, outputting a second signal to the near field communicator;
    transferring the authentication data to the controller in accordance with the second signal; and
    authenticating, by the controller, a user of the mobile device using the authentication data and causing display, on the console, of a message that a job can be executed.

12. A non-transitory computer-readable storage medium comprising an executable program, which when executed, causes performance of a method of operating an image forming apparatus including a near field communicator, a console, and a controller configured to control the image forming apparatus, the method comprising:
    detecting, by the near field communicator, receipt of authentication data from a mobile device via near field communication, storing the authentication data in a memory, and outputting a first signal to the controller;
    returning, by the controller, the image forming apparatus from a power saving mode in accordance with the first signal and, after the image forming apparatus has returned from the power saving mode, outputting a second signal to the near field communicator;
    transferring the authentication data to the controller in accordance with the second signal; and
    authenticating, by the controller, a user of the mobile device using the authentication data and causing display, on the console, of a message that a job can be executed.

13. An image forming apparatus comprising:
    a near field communicator having a memory;
    a console; and
    a controller configured to control the image forming apparatus,
    wherein the near field communicator is configured to detect receipt of authentication data from a mobile device via near field communication, store the authentication data in the memory, and output a first signal to the controller,
    wherein the controller is configured to return the image forming apparatus from a power saving mode in accordance with the first signal,
    wherein the near field communicator is configured to transfer the authentication data to the controller after the image forming apparatus has returned from the power saving mode, and
    wherein the controller is configured to authenticate a user of the mobile device using the authentication data and display a message that a job can be executed on the console.

14. The image forming apparatus according to claim 13, wherein the controller is configured to perform an authentication process to authenticate the user of the mobile device after the image forming apparatus has returned from the power saving mode and after receiving the authentication data transferred from the near field communicator.

15. The image forming apparatus according to claim 13, wherein the near field communicator is configured to output the first signal in a case where the controller is operating in the power saving mode in which power is not supplied to controller, and the controller is configured to receive the transferred authentication data after returning from the power saving mode to a fully activated state.

16. The image forming apparatus according to claim 13, wherein the near field communicator is configured to output the first signal to the controller before storing the authentication data in the memory.

* * * * *